United States Patent [19]
Patel et al.

[11] Patent Number: 6,088,217
[45] Date of Patent: Jul. 11, 2000

[54] CAPACITOR

[75] Inventors: Hitendra K. Patel, Palatine; Changming Li, Vernon Hills, both of Ill.

[73] Assignee: Motorola, Inc., Schaumburg, Ill.

[21] Appl. No.: 09/087,888

[22] Filed: May 31, 1998

[51] Int. Cl.$^7$ .............................. H01G 9/042; H01G 9/04
[52] U.S. Cl. .................... 361/509; 504/516; 504/529; 504/532; 29/25.03
[58] Field of Search .................................. 361/502, 503, 361/504, 508–509, 516, 522, 524, 525, 528–529, 534, 532; 29/25.03; 429/213

[56] References Cited

U.S. PATENT DOCUMENTS

| | | | |
|---|---|---|---|
| 4,438,481 | 3/1984 | Phillips et al. ........................... | 361/502 |
| 5,150,283 | 9/1992 | Yoshida et al. ........................... | 361/502 |
| 5,621,609 | 4/1997 | Zheng et al. ............................. | 361/503 |
| 5,733,661 | 3/1998 | Ue et al. .................................. | 428/426 |
| 5,754,394 | 5/1998 | Evans et al. ............................. | 361/516 |

*Primary Examiner*—Dean A. Reichard
*Assistant Examiner*—Anthony Dinkins
*Attorney, Agent, or Firm*—Felipe J. Farley; Philip H. Burrus, IV

[57] ABSTRACT

A hybrid capacitor with improved energy density employs a cathode including an organic material and optionally a gel, solid, or composite electrolyte material. However, like conventional electrolytic capacitors, said hybrid capacitor employs a valve metal and its respective oxide dielectric layer on the anode side of the cell.

8 Claims, 2 Drawing Sheets

CAPACITOR

TECHNICAL FIELD

This invention relates in general to the field of electrochemical cells, and in particular to cathode and electrolyte materials for capacitors.

BACKGROUND OF THE INVENTION

Energy generation and storage have long been a subject of study and development. Of special significance is the storage of electrical energy in a compact form that can be easily charged and discharged, such as a rechargeable battery and/or electrochemical capacitor. High power, especially high current pulse rechargeable electrochemical storage devices are required in applications using electrical pulse, such as two-way communications, power tools, and laptop computers to name but a few. In these devices, high electrochemical kinetic rate, long cycle life of the electrodes, and good ionic conductivity of the electrolyte are extremely important features. In addition, small size of electrical components has become a highly valued feature because of the drive toward miniaturization of circuits in portable devices.

Where an energy storage device is needed with excellent power burst capabilities and rapid electrical response, electrolytic capacitors have been favorite choices for circuit design engineers. However, although their performance characteristics have secured them a prominent place in electrical circuits, the capacitance of these capacitors is relatively small, thus high-capacitance electrolytic capacitors are undesirably large in size.

Accordingly, there exists a need for capacitors with many of the same performance characteristics of electrolytic capacitors, but with improved energy density.

BRIEF SUMMARY OF THE INVENTION

The invention is a hybrid capacitor with improved energy density. The capacitor cathode of the instant invention comprises an organic material and optionally a gel, solid, or composite electrolyte material.

DETAILED DESCRIPTION OF THE PREFERRED EMBODIMENT

The invention is a hybrid capacitor with improved energy density. The capacitor cathode of the instant invention comprises an organic material and optionally a gel, solid, or composite electrolyte material. However, like conventional electrolytic capacitors, the invention employs a valve metal and its respective oxide dielectric layer on the anode side of the cell.

Figure 1:
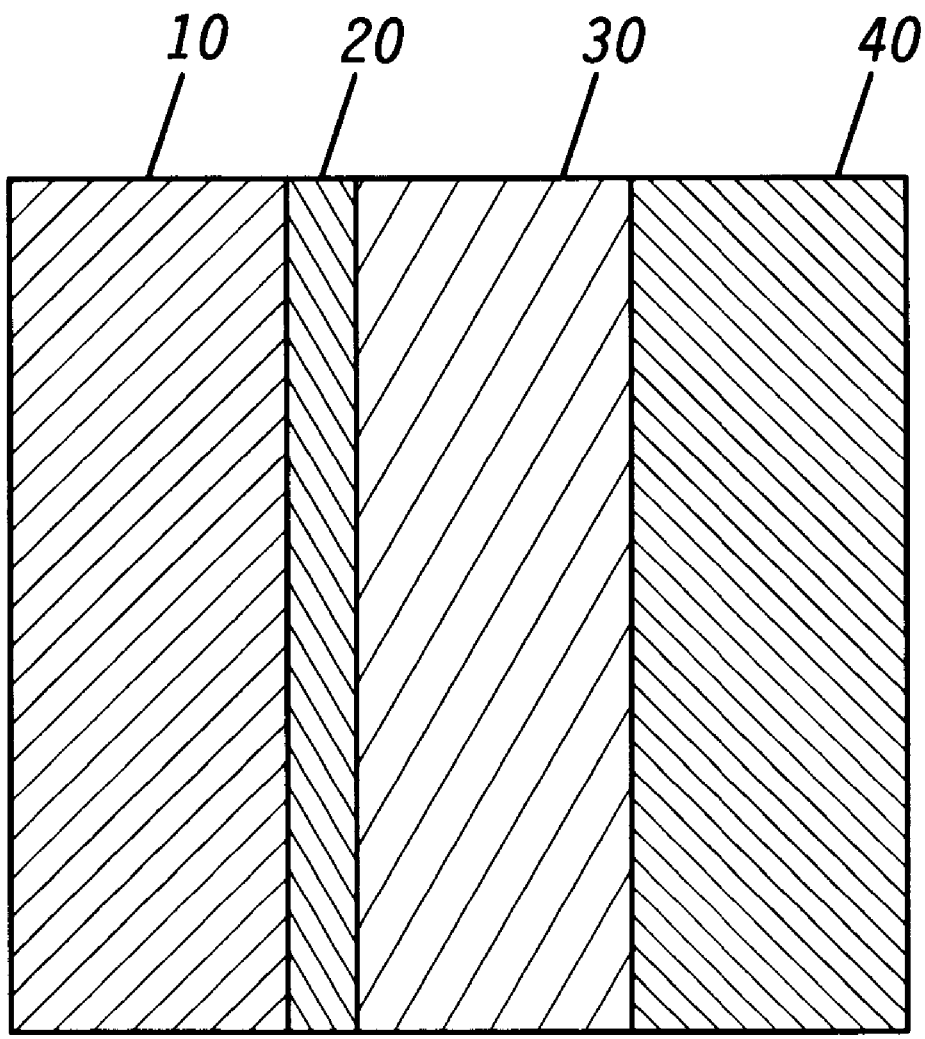
FIG. 1 is a schematic representation of a conventional electrolytic capacitor cell (1) comprising a valve metal composition anode (10), a dielectric layer comprised of an oxide of said valve metal (20), and electrolyte (30) and a valve metal composition cathode (40). Features 30 and 40 together are considered to be the cathode. In the instant invention, the valve metal of cathode 40 is replaced by an organic substance, and the term organic includes carbon materials. Optionally, in the present invention electrolyte 30 is replaced by an electrolyte in the form of a gel, a solid, or a composite.

Typically the anode and cathode of an electrolytic capacitor are each comprised of a "valve metal", such as Al, Ti, Ta, Nb, Zr, or Hf. The valve metals are preferred not only because of their good electronic conductivity, but also because the respective metal oxides are dense, adhere tightly to the metal surface, are electrically insulating, possess high dielectric constant and high dielectric strength, and can be deposited as a layer with good control of thickness. In a typical electrolytic capacitor (FIG. 1), a valve metal anode is bonded with an electrochemically grown dielectric oxide layer on the side facing the cathode. The efficiency of electrical and ionic exchanges at the cathode interface is ensured by interposing an electrolyte between the oxide and the cathode metal: the electrolyte and cathode metal together are deemed to be the cathode. From this description it will be seen that electrolytic capacitors are polar, that is, they are asymmetric and have a bias. Hence it is important to charge electrolytic capacitors in the correct direction, otherwise charging could result in oxidation of the cathode and decomposition of the electrolyte, potentially causing the cell to fail. The magnitude of the voltage drop across the dielectric capacitor is typically engineered by specifying the thickness of the oxide dielectric (e.g., ca. 1.5 nm/V for oxides of Al or Ta), and choosing a dielectric oxide with a sufficiently high breakdown voltage.

However, increases in oxide layer thickness result in lower capacitance of the cell according to the following equation, $$C = (\epsilon_r)(\epsilon_0)(\text{Area/thickness})$$

where C represents cell capacitance, $\epsilon_r$ corresponds to the relative dielectric constant of the oxide, and $\epsilon_0$ corresponds to the permittivity of free space. Thus the product of capacitance (C) and voltage (V) is constant for a given materials system. The electrostatic resistance (ESR) is an important figure of merit for capacitors, and does not vary greatly as a function of resistance for higher voltage capacitors.

Figure 2:
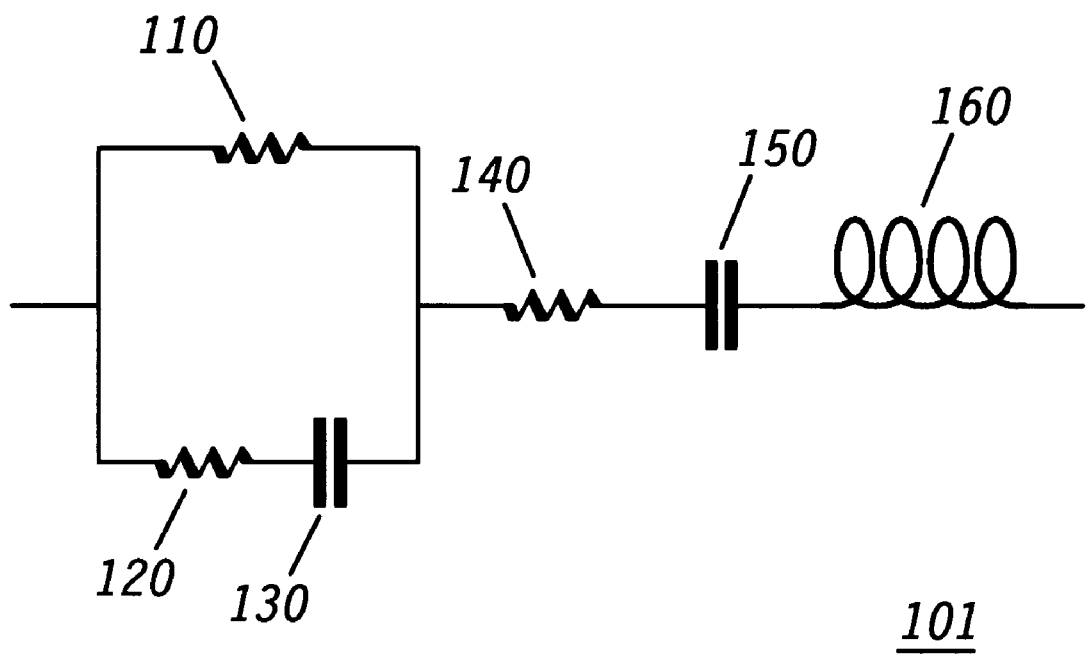
FIG. 2 is a schematic representation of a circuit model (101) for the electrical characteristics of an electrolytic capacitor: the same model can also be employed to understand the capacitor of the instant invention. Resistor 110 corresponds to the leakage resistance of the cell; resistor 120 corresponds to the electrostatic resistance (ESR) of the anode oxide film; and capacitor 130 corresponds to the anode oxide film capacitance. Resistor 140 represents electrolyte resistance; capacitor 150 represents the cathode capacitance; and inductor 160 represents the inductance of the electrical leads. Total ESR of the cell is the sum of the electrolyte resistance and the ESR of the oxide film.

Generally the cathode capacitance is smaller than anode capacitance in electrolytic capacitors, thus it is the limiting component. In part this is due to the difficulty of creating a truly integrated interface, as opposed to the case for the anode/oxide interface, which has excellent integration of different materials phases. FIG. 2 depicts an equivalent circuit model of an electrolytic capacitor, from which it can be seen that the capacitance of the device would more nearly follow that of the anode if the in-series cathode capacitance were sufficiently large. This can also be deduced by a consideration of the following equation:

$$\text{Total Capacitance} = \frac{(\text{Anode Capacitance}) \times (\text{Cathode Capacitance})}{(\text{Anode Capacitance}) + (\text{Cathode Capacitance})}$$

$$= \frac{\text{(Anode Capacitance)}}{\text{(Anode Capacitance/Cathode Capacitance)} + 1}$$

Thus when the cathode capacitance reaches an order of magnitude more than that of the anode, the denominator approaches unity and the device capacitance is approximately that of the anode.

Referring again to FIG. 2, the voltage drop over the two capacitors shown maintains the relationship:

(Cathode Capacitance)×(Cathode Potential)=(Anode Capacitance)×(Anode Potential)

However, the cathode potential must not exceed the breakdown potential, and this consideration is reflected by substituting in the breakdown potential for the cathode potential. Integrating this fact with the equation immediately above, cathode voltage is then calculated, using for the anode voltage the difference between the breakdown voltage and the rated voltage of the cell. The anode capacitance required to make a device with a specific capacitance for a rated voltage can then be expressed as follows:

$$\text{Anode Capacitance} = \frac{\text{(Device Capacitance)} \times \text{(Rated Voltage)}}{\text{(Rated Voltage)} - \text{(Breakdown Voltage)}}$$

For example, a 20V, 60 mF capacitor with an aqueous electrolyte (1V breakdown potential) would require the anode capacitance to be 63 mF, corresponding to an oxide thickness of at least 30 nm and cathode capacitance of 1.2F. The frequency response of such a device is still quite similar to that of an electrolytic capacitor because of its low capacitance and ESR, providing that one utilizes a cathode material with the ability to rapidly exchange ions. Choosing a cathode material with high capacitance but slow kinetic exchange rate compromises the frequency response and clamps the cell output at a low discharge rate, which would defeat the purpose of an electrolytic-like capacitor hybrid, though such a device might have other uses. However if the cathode possesses a sufficiently high intrinsic capacity, its kinetic deficiencies can be compensated in part or in full.

Thus it is established that substituting a high-capacitance, high-rate material for the cathode material offers a demonstrable advantage over conventional electrolytic capacitors. One example of such a hybridization of the capacitor was recorded in U.S. Pat. No. 5,369,547: the valve metal on the cathode side was replace by ruthenium oxide. While ruthenium oxide is well known as an electrode material, for instance having been widely explored in electrochemical capacitors, it is a costly material, and moreover presents unique difficulties and added costs in obtaining bonding to a metallic substrate. The present invention introduces an approach to obtain the desired cathode energy density using low cost materials for which processing technologies are inexpensive and commonly available.

In the present invention the anode side comprises the valve metals typically used in electrolytic capacitors, such as Ta, Al, Nb, Zr, Hf, or Ti, already noted above, and the corresponding oxide dielectric layers also remain the same. However, the cathode is comprised of an organic substance such as is found in a double layer capacitor electrode, e.g., activated carbon. Alternatively, the cathode is comprised of an organic substance such as is found in a so-called redox electrode; typical examples are conducting polymers such as polyaniline, polypyrrole, polyacetylene, poly(phenylene vinylene) and their copolymers and derivatives; as well as other redox substances such as tetra(cyano)-quinodimethane, redox carbon, p-type conducting polymers, n-type conducting polymers; and combinations thereof.

The electrolyte of the instant invention may be comprised of liquid, gel, solid, and or a composite. Any solution with mobile ions can be dissolved in a polymer to make an electrolyte, so long as the ions or solution does not attack the aluminum, titanium, etc. Examples of suitable liquids are sodium hydroxide solutions, potassium hydroxide solutions, lithium hydroxide solutions, sulfuric acid, phosphoric acid, boric ammonium solution, glycol ammonium salts, and combinations thereof. It should be noted that numerous proton-conducting electrolytes are known, and the invention is not limited to the few examples cited herein. In addition, ions other than protons may be used as the electrolytes, and media other than water may be used, as desired. Suitable gel electrolytes comprise in addition to an electrolyte solution, a binder polymer such as poly(vinyl alcohol), NAFION™ (a copolymer of perfluoro-3,6-dioxa-4-methyl-7-octene-sulfonic acid and TEFLON® (polytertrafluoroethylene)), and poly(benzimidazole) and its derivatives. Suitable solid electrolytes also contain a binder polymer and a proton conducting electrolyte (such as a viscous acid such as phosphoric acid). The term composite electrolyte as used here refers to an electrolyte in which two or more morphological phases can be discerned, for example, wherein one phase is perceived to be gel-like and another phase is perceived to be solid-like.

An advantage of the solid and gel electrolytes is their ability to intimately wet the dielectric, yet because of their limited flow they establish no contact with the underlying anode metal, thus anode corrosion and decay of the cell voltage are both avoided. Solid capacitors are also less sensitive to dry-out and to thermal decomposition at high temperatures. Graded electrolytes can be used, for instance employing a liquid electrolyte to wet the oxide surface and ensure penetration of ions, while concurrently employing a gel electrolyte to enhance adhesion of cell components.

It is believed that the invention may be better understood by a consideration of the following examples:

EXAMPLE 1

A hybrid capacitor device was made as follows. A tantalum anode was extracted from a commercial 30 mF, 8V, liquid electrolyte capacitor (supplier: Evans, Inc.). Said tantalum article was then employed as the anode in a hybrid capacitor made according to the instant invention. A 30-nm thick layer of tantalum oxide present on the surface of the anode was employed as the oxide dielectric layer in the present invention. The cathode was comprised of activated carbon, and was extracted from a carbon double-layer (with sulfuric acid electrolyte) 6F capacitor (supplier: NEC), and was soaked with a 5M aqueous sulfuric acid solution on its side facing the anode; the electrodes were held in close proximity to each other, being separated by a 200-micron thick Celgard membrane (supplier: Hoechst-Celanese). The hybrid capacitor assembled in this manner possessed ca. 55 mF capacitance as measured at 0.1 Hz, which was near the expected value for the capacitances of the two component electrodes in series within the cell. This was approximately the theoretical energy density expected for this device, and was nearly twice that of the comparably sized tantalum capacitor of similar voltage and capacitance. The hybrid capacitor of the instant invention was able to accommodate an 8V charge, just as in the tantalum electrolytic capacitor.

The materials cost of this hybrid capacitor was approximately half that of the equivalent tantalum electrolytic capacitor.

EXAMPLE 2

A hybrid capacitor device is constructed as in example one, except that the electrolyte is comprised of a mixture of poly(vinyl alcohol and phosphoric acid).

EXAMPLE 3

A hybrid capacitor device is constructed as in example two, except that the cathode is comprised of poly(aniline).

EXAMPLE 4

A hybrid capacitor device is constructed as in example three, except that the electrolyte is comprised of poly (benzimidazole) and phosphoric acid.

EXAMPLE 5

A hybrid capacitor device is comprised of an aluminum anode having on its side facing the cathode a 30-nm thick electrochemically formed layer of aluminum oxide. The cathode is comprised of activated carbon, and is infused with boric ammonium solution on its side facing the anode; the electrodes are held in close proximity to each other.

EXAMPLE 6

A hybrid capacitor device is constructed as in example five, except that the electrolyte is comprised of poly (benzimidazole) and sulfuric acid.

EXAMPLE 7

A hybrid capacitor device is constructed as in example three, except that the electrolyte is comprised of poly(vinyl alcohol) and an acid.

It will be appreciated by now that there has been provided an improved configuration for cells with high power output capabilities and energy density above that of conventional electrolytic capacitors. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A capacitor cell said cell comprising:
   an anode comprised of tantalum;
   a layer on at least one surface of said anode, said layer being comprised of tantalum oxide;
   an electrolyte; and
   a cathode comprised of an organic material;
   wherein said organic material is comprised of carbon, and said electrolyte is comprised of sulfuric acid.

2. A capacitor cell, said cell comprising:
   an anode comprised of tantalum;
   a layer on at least one surface of said anode said layer being comprised of tantalum oxide;
   an electrolyte; and
   a cathode comprised of an organic material;
   wherein said organic material is comprised of carbon, and said electrolyte is comprised of poly(vinyl alcohol) and phosphoric acid.

3. A capacitor cell, said cell comprising:
   an anode comprised of tantalum;
   a layer on at least one surface of said anode, said layer being comprised of tantalum oxide;
   an electrolyte; and
   a cathode comprised of an organic material;
   wherein said organic material is comprised of polyaniline, and said electrolyte is comprised of poly(vinyl alcohol) and phosphoric acid.

4. A capacitor cell, said cell comprising:
   an anode comprised of tantalum;
   a layer on at least one surface of said anode, said layer being comprised of tantalum oxide;
   an electrolyte; and
   a cathode comprised of an organic material;
   wherein said organic material is comprised of polyaniline, and said electrolyte is comprised of poly (benzimidazole) and phosphoric acid.

5. A capacitor cell, said cell comprising:
   an anode comprised of titanium;
   a layer on at least one surface of said anode, said layer being comprised of titanium oxide;
   an electrolyte; and
   a cathode comprised of an organic material;
   wherein said organic material is comprised of carbon, and said electrolyte is comprised of sulfuric acid.

6. A capacitor cell, said cell comprising:
   an anode comprised of titanium;
   a layer on at least one surface of said anode, said layer being comprised of titanium oxide;
   an electrolyte; and
   a cathode comprised of an organic material;
   wherein said organic material is comprised of carbon, and said electrolyte is comprised of poly(vinyl alcohol) and phosphoric acid.

7. A capacitor cell, said cell comprising:
   an anode comprised of titanium;
   a layer on at least one surface of said anode, said layer being comprised of titanium oxide;
   an electrolyte; and
   a cathode comprised of an organic material;
   wherein said organic material is comprised of polyaniline, and said electrolyte is comprised of poly(vinyl alcohol) and phosphoric acid.

8. A capacitor cell, said cell comprising:
   an anode comprised of titanium;
   a layer on at least one surface of said anode, said layer being comprised of titanium oxide;
   an electrolyte; and
   a cathode comprised of an organic material;
   wherein said organic material is comprised of polyaniline, and said electrolyte is comprised of poly (benzimidazole) and phosphoric acid.

* * * * *